3,464,976
Patented Sept. 2, 1969

3,464,976
CITRUS OIL RECOVERY FROM EMULSIONS
Peter L. Douglas, Glendora, Calif., assignor to Brown Citrus Machinery Corporation, Whittier, Calif., a corporation of California
No Drawing. Filed Oct. 6, 1966, Ser. No. 584,675
Int. Cl. C11b 9/00
U.S. Cl. 260—236.6                                8 Claims

ABSTRACT OF THE DISCLOSURE

A process for the recovery of citrus oils from the emulsions thereof which comprises adding an elcetrolyte salt to a citrus oil-water emulsion containing a wetting agent to break out the oil from the emulsion.

---

This invention relates to a novel method for the breaking of water-citrus oil emulsions.

In the production of citrus essential oils, the oil is liberated from the peel by the application of pressure and is picked up by water. This dilute mixture of oil and water is generally then put through a desludging centrifuge where most of the solids are removed, and the oil is concentrated into a creamy emuslion containing on the order of 40 to 80% by weight of oil. This cream is then centrifuged again to break out the finished oil. The finished oil is, of course, the desired commercial product.

It has become customary in this industry to utilize a wetting agent to facilitate the breaking of the cream since even in modern high recovery citrus oil processes, the emulsion does not break readily in the centrifuge. Many wetting agents have, therefore, been utilized for this purpose, including the alkyl aryl sulfonates and the alkyl sulfonates. In particular, one of the latter group, i.e., sodium lauryl sulfate has found favor because it has been approved by the Government for use in edible food compositions.

It has been found, however, that the use of sodium lauryl sulfate requires very careful dosage when employed to break citrus oil-water emulsions. If too little of the wetting agent is used it is ineffective. On the other hand, if too much of the wetting agent is added, the emulsion becomes even more difficult to break than it was prior to the addition of the wetting agent. Even with the most careful dosage, the oil-water emulsion may not break out clear in one pass through the centrifuge, and it is rarely possible to recover 100% of the oil available in the creamy emulsion.

Accordingly, the present invention is primarily concerned with the improvement in the breaking out of citrus oil in a citrus oil-water emulsion utilizing a wetting agent. More particularly, according to the present invention it has been found that the breaking of the creamy emulsion can be substantially and surprisingly improved by the addition thereto of a small effective amount of an electrolyte salt as more fully hereinafter described.

Accordingly, it is a principal object of the present invention to provide a novel method for the breaking of a citrus oil-water emulsion.

More specifically, it is an object of the present invention to improve the breaking out of the citrus oil in an emulsion by the addition thereto of a small effective amount of an electrolyte salt.

In another aspect of my invention, it is an object thereof to eliminate the criticality in the wetting agent dosage used to aid in emulsion breaking.

These and other objects and advantages of the present invention will become apparent from the more detailed description which follows.

Briefly, the present invention, involves the process comprising the addition of an electrolyte salt to a citrus oil-water emulsion cream containing a wetting agent to break out the oil therefrom and permit easy separation of the oil from the water. The actual separation of the citrus oil from the water after the addition of the electrolyte salt is normally accomplished by centrifuging and decantation.

An important feature of the present invention resides in the discovery that the dosage of the wetting agent becomes less critical when the electrolyte salt is used. Thus, when the salt is used emulsion breaking can be obtained with an amount of wetting agent which would otherwise represent an overdose of wetting agent.

I have found that if a salt such as calcium chloride is added to the citrus oil-water cream after adding the wetting agent, the emulsion breaks very easily and it is possible to recover substantially all of the citrus oil. Calcium chloride is only one of many inorganic and organic salts that are effective in the practice of the present invention. Metallic chlorides or sulfates such as aluminum chloride, aluminum sulfate, aluminum ammonium sulfate, stannous chloride, barium chloride, ferric chloride, ferrous sulfate, cupric sulfate, etc., are effective. I have found that salts such as potassium citrate, sodium sulfate, sodium chloride, magnesium sulfate and sodium bicarbonate have some effect but are substantially less advantageous than the salts discussed above.

The salt can be added to the emulsion in dry form or in solution and the concentration is not very critical. I have had good results adding as little as 0.05% of an effective salt and as much as 4.0%. As much as 1% of wetting agent, normally sodium lauryl sulfate, can be used, or perhaps a litle more, and as little as 0.1%, but the preferred range for lemon oil cream is 0.5% sodium lauryl sulfate and 0.5% salt.

The following example is presented solely to illustrate the invention and should no be regarded as limiting in any way. In the example, the percentages are by weight.

EXAMPLE

In the following example, a lemon cream was treated with 1% of sodium lauryl sulfate, and aliquots of the treated cream were mixed with 0.5% of various salts. The mixtures were spun in a tube centrifuge and the percentage of available oil recovered as clear oil was noted as follows:

| | Percent recovery |
|---|---|
| Sodium lauryl sulfate | Trace |
| +$AlCl_3$ (aluminum chloride) | 100 |
| $CaCl_2$ (calcium chloride) | 100 |
| $SnCl_2$ (stannous chloride) | 100 |
| $BaCl_2$ (barium chloride) | 100 |
| $Al_2(SO_4)_3$ (aluminum sulfate) | 100 |
| $FeCl_3$ (ferric chloride) | 100 |
| $MnCl_2$ (manganese chloride) | 100 |
| $CoSO_4$ (cobalt sulfate) | 100 |
| $Fe_2(SO_4)_3$ (ferric sulfate) | 100 |
| $FeSO_4$ (ferrous sulfate) | 100 |
| $ZnSO_4$ (zinc sulfate) | 100 |
| $CuCl_2$ (cuprous chloride) | 100 |
| $MgCO_3$ (magnesium carbonate) | 100 |
| NaCl (sodium chloride) | 50 |
| $NH_4Cl$ (ammonium chloride) | 4 |
| $K_3C_6H_5O_7$ (potassium citrate) | 4 |
| $Na_2SO_4$ (sodium sulfate) | 2 |
| $MgSO_4$ (magnesium sulfate) | 2 |
| $MgHCO_3$ (magnesium bicarbonate) | Trace |
| $MgCl_2$ (magnesium chloride) | Trace |
| $K_2SO_4$ (potassium sulfate) | Trace |
| $KHCO_3$ (potassium bicarbonate) | Trace |
| KCl (potassium chloride) | Trace |

As will be immediately apparent to those skilled in the art, the present invention provides a surprisingly simple method for increasing the recovery of citrus oil from emulsions during processing. By the practice of the present invention, substantially all of the citrus oil can be recovered without the need for the careful adjustment of the amount of wetting agent utilized. Also, since the present invention can provide substantially complete recovery in one centrifuging operation, the invention reduces centrifuging costs and the time associated therewith. In general, the present invention is applicable to the recovery of any citrus oil including lemon, lime, orange, grapefruit and the like. Likewise, while the invention has been described with reference to the use of certain wetting agents in the emulsion, it will be understood that any of the commonly used wetting agents for citrus oil emulsions are applicable in the practice of this invention.

Having fully described the invention, it is intended that it be limited only by the lawful scope of the appended claims.

I claim:

1. A process for the recovery of citrus oils from emulsions thereof which comprises adding an electrolyte salt to a citrus oil-water emulsion containing a wetting agent to break out the oil from the emulsion, said electrolyte salt being selected from the group consisting of aluminum chloride, calcium chloride, stannous chloride, barium chloride, aluminum sulfate, ferric chloride, manganese chloride, cobalt sulfate, ferric sulfate, zinc sulfate and cuprous chloride.

2. The process of claim 1 wherein the wetting agent is an alkyl sulfate.

3. The process of claim 1 wherein the wetting agent is sodium lauryl sulfate.

4. The process of claim 1 wherein the citrus oil is selected from the group consisting of lemon, lime, orange, and grapefruit.

5. The method of claim 1 wherein the electrolyte salt is added in solution form.

6. The method of claim 1 wherein the electrolyte salt is added in solid form.

7. The method of claim 1 wherein the electrolyte salt is added in an amount from about 0.05% to about 4.0% by weight of the emulsion, and the wetting agent is present in the emulsion in an amount from about 0.1% to about 1.0% by weight of the emulsion.

8. A process for the recovery of citrus oils from emulsions thereof which comprises adding an electrolyte salt to a citrus oil-water emulsion containing a wetting agent, said electrolyte salt selected from the group consisting of aluminum chloride, calcium chloride, stannous chloride, barium chloride, aluminum sulfate, ferric chloride, manganese chloride, cobalt sulfate, ferric sulfate, zinc sulfate and cuprous chloride, said salt being effective to break out substantially all of the citrus oil in said emulsion and completing the separation by centrifuging.

References Cited

UNITED STATES PATENTS

| | | | |
|---|---|---|---|
| 2,296,004 | 9/1942 | Platt | 260—236.6 |
| 2,729,564 | 1/1956 | Keller | 260—236.6 |
| 2,776,278 | 1/1957 | Birds | 260—236.6 |

JAMES A. PATTEN, Primary Examiner